Oct. 30, 1928.
B. E. BYRD
1,689,859
TAPE FASTENER
Filed April 6, 1928
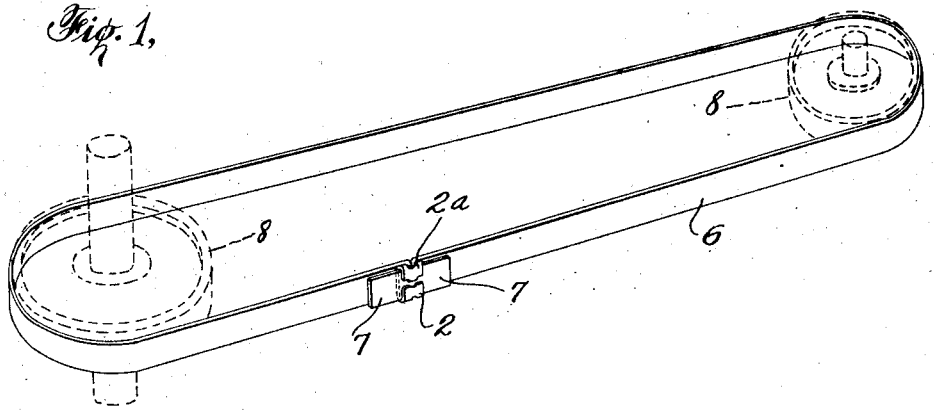
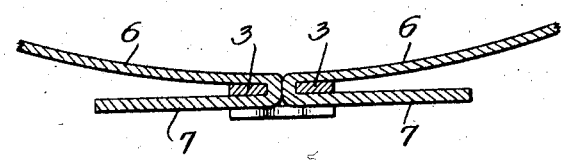
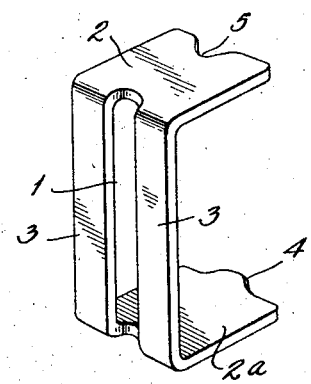
INVENTOR
BRITTON E. BYRD
BY
Meyers & Jones
ATTORNEYS Patented Oct. 30, 1928.

1,689,859

UNITED STATES PATENT OFFICE.

BRITTON E. BYRD, OF GASTONIA, NORTH CAROLINA, ASSIGNOR TO MILL DEVICES COMPANY, INC., OF GASTONIA, NORTH CAROLINA, A CORPORATION OF NORTH CAROLINA.

TAPE FASTENER.

Application filed April 6, 1928. Serial No. 267,897.

This invention is an improvement in tape fasteners, and more particularly in a fastener designed for connecting the ends of a tape into a belt for turning spindles and winders. Usually the tape lengths from which such belts are made are connected together by lapping and sewing. The whirl on which the tape runs is relatively small, and because of the lap, there is an increasing tension on the tape when the lap strikes the whirl. For this reason, the belts wear out and break at the lap.

One of the primary objects of the present invention is the provision of a fastener by means of which the ends of the lap may be connected into an endless belt with a continuous smooth inner surface, so that the inner face of the belt is substantially without a break, and there is no change in tension when the connected ends strike the whirl.

Another object is the provision of a fastener which may be easily applied in the formation of a belt, and without any weakening of the tape by interrupting the continuity thereof.

In the drawings forming a part hereof:—

Fig. 1 is a perspective view of a belt having the improved fastener.

Fig. 2 is a longitudinal section through the fastener.

Fig. 3 is a perspective view of the fastener before it is applied to the belt.

The present embodiment of the invention is an integral structure formed from sheet material of suitable weight, by stamping or otherwise.

The improved fastener is a plate having a longitudinally extending central slot 1, which is somewhat greater in length than the width of the tape, the ends of which the fastener is designed to connect. At the ends of the slot, the ends 2—2$^a$ of the plate are bent laterally as shown, into substantially right angles to the body of the plate, and into substantially parallel relation.

Thus two similar bars 3 are provided, separated by the slot, and supported by the bent ends 2—2$^a$, and it will be noticed referring to Fig. 3, that the ends of the slot extend into the angular ends 2—2$^a$ of the plate. Preferably one of the ends 2$^a$ is provided with a central tongue 4, and the other end 2 is provided with a notch 5 in substantial register with the tongue.

In connecting the ends of the tape into a belt 6, the said ends indicated at 7 are passed through the slot 1 from that face of the plate which is remote from the ends 2—2$^a$, and the ends are lapped or doubled about the respective bars 3.

The ends 2 of the plate are then bent down upon the ends 7 of the belt as shown in Figs. 1 and 2, and the said ends are clamped tightly in place against the bars 3. The slot is preferably of a width such that the tape ends will abut in the slot, and thus there is provided a smooth inner face of the belt as clearly shown in Fig. 2. When the connection passes over the whirls or pulleys 8, there will be no increase in tension on the belt, and consequently no strain on the connected ends. For this reason the life of the belt will be greatly lengthened.

What is claimed as new is:—

1. A belt fastener including a plate having a longitudinally extending slot through which the ends of the tape to be formed into a belt may be passed and lapped back upon the body of the belt, the ends of the plate of a length to enable them to be bent back upon the ends of the tape to clamp them to the plate body, said slot of a width substantially twice the thickness of the tape.

2. A belt fastener including a plate having a longitudinally extending slot of a width approximately double the thickness of the tape to be connected into a belt and of a length corresponding to the width of the tape, the ends of the plate being bent at the ends of the slot to extend transversely at right angles to the body, the ends of the slot extending into the bent ends of the plate.

Signed at Gastonia, in the county of Gaston and State of North Carolina, this 4th day of April A. D. 1928.

BRITTON E. BYRD.